United States Patent [19]

Markusch et al.

[11] Patent Number: 4,701,480

[45] Date of Patent: Oct. 20, 1987

[54] STABLE, AQUEOUS DISPERSIONS OF POLYURETHANE-UREAS

[75] Inventors: Peter H. Markusch, McMurray; J. W. Rosthauser, Imperial, both of Pa.; Robin E. Tirpak, Wheeling, W. Va.

[73] Assignee: Mobay Corporation, Pittsburgh, Pa.

[21] Appl. No.: 778,836

[22] Filed: Sep. 23, 1985

[51] Int. Cl.$^4$ ............................ C08J 3/02; C08L 75/04
[52] U.S. Cl. ..................................... 523/340; 524/591; 524/839; 524/840
[58] Field of Search ...................... 524/591, 839, 840; 523/340

[56] References Cited

U.S. PATENT DOCUMENTS

| | | | |
|---|---|---|---|
| 3,479,310 | 11/1969 | Dieterich et al. | 260/29.2 |
| 3,870,684 | 3/1975 | Witt et al. | 260/75 |
| 4,066,591 | 1/1978 | Scriven et al. | |
| 4,092,286 | 5/1978 | Noll et al. | 260/29.2 |
| 4,108,814 | 8/1978 | Reiff | 260/29.2 |
| 4,171,391 | 10/1979 | Parker | 427/246 |
| 4,203,883 | 5/1980 | Hangauer | 260/29.2 |
| 4,237,264 | 12/1980 | Noll et al. | 528/67 |
| 4,238,378 | 12/1980 | Markusch et al. | 260/29.2 |
| 4,293,474 | 10/1981 | Dieterich et al. | 260/29.2 |
| 4,385,137 | 5/1983 | Lorenz et al. | 523/310 |
| 4,401,786 | 8/1983 | Wenzel et al. | 524/591 |
| 4,408,008 | 10/1983 | Markusch | 524/591 |
| 4,501,852 | 2/1985 | Markusch et al. | 524/591 |

FOREIGN PATENT DOCUMENTS 2381796 10/1978 France.

*Primary Examiner*—C. Warren Ivy
*Attorney, Agent, or Firm*—Gene Harsh; Joseph C. Gil; Thomas W. Roy

[57] ABSTRACT

The present invention is directed to a process for the preparation of aqueous polyurethane-urea dispersions with improved hydrolytic stability by (a) forming an aqueous polyurethane-urea dispersion, optionally by chain extending an aqueously dispersed isocyanate-terminated prepolymer, containing carboxylic acid groups neutralized with volatile organic bases, (b) converting the volatile, organic base-neutralized carboxylic acid groups to nonvolatile cation-neutralized carboxylate groups by adding alkali metal salts of organic or inorganic acids having a pKa greater than 0 to the aqueous polyurethane-urea dispersion of (a) in an amount sufficient to displace at least a portion of the volatile organic bases and, optionally, (c) removing the volatile organic bases by distillation, optionally under reduced pressure.

The present invention is also directed to the products produced by this process.

21 Claims, No Drawings

STABLE, AQUEOUS DISPERSIONS OF POLYURETHANE-UREAS

BACKGROUND OF THE INVENTION

1. Field of the Invention

The present invention is directed to a process for the production of stable, aqueous dispersions of polyurethane-ureas having good hydrolytic stability and containing chemically incorporated carboxylate groups which are neutralized with specific alkali metal cations.

2. Description of the Prior Art

The production of linear or cross-linked aqueous polyurethane-urea dispersions is known as shown by U.S. Pat. Nos. 3,479,310; 4,066,591; 4,092,286; 4,108,814; 4,237,264; and 4,238,378 which disclose linear polyurethane-ureas and U.S. Pat. Nos. 3,870,684, 4,203,883 and 4,408,008, which disclose cross-linked polyurethane-ureas. The aqueous polyurethane-urea dispersions may be used for a wide range of commercial applications such as adhesives or coatings for various substrates including textile fabrics, plastic, wood, glass fibers and metals. Chemical resistance, abrasion resistance, toughness, tensile strength, elasticity and durability are among the many desirable properties of these coatings. In some cases these properties of coatings prepared from aqueous polyurethane-urea dispersions have equaled or even surpassed the performance levels of coatings obtained from solvent-based polyurethane lacquers.

Most of the commercial aqueous polyurethane-urea dispersions contain chemically incorporated carboxylic acid groups which are neutralized with volatile organic bases such as tertiary amines to form the corresponding carboxylate groups. These groups provide hydrophilicity to the polyurethane-ureas and enable them to be stably dispersed in water. One of the properties of coatings produced from these aqueous polyurethane-urea dispersions which needs to be improved in order to match the performance of coatings prepared from solvent-based polyurethane lacquers is the hydrolytic stability, i.e. the resistance to degradation of coatings properties caused by humidity aging. This property is adversely affected by the volatile base-neutralized carboxylate groups.

Previous methods to improve the hydrolytic stability have been disclosed in U.S. Pat. No. 4,501,852 wherein aqueous polyurethane-urea dispersions are prepared by using a specific mixture of volatile and nonvolatile bases to neutralize the chemically incorporated acid groups. It is disclosed therein that the presence of nonvolatile cations such as sodium increases the hydrolytic stability of coatings produced from the dispersions, while the presence of cations produced from volatile bases increases the water resistance or resistance to water swell of the coatings.

U.S. Pat. No. 4,401,786 discloses the addition of electrolytes, preferably ones based on divalent cations, to existing polymer dispersions to improve the water resistance and/or blocking resistance of coatings prepared from the dispersions. However, the stability of these dispersions is affected by the addition of electrolytes unless they also contain nonionic hydrophilic groups. In addition, the use of electrolytes based on divalent cations appears to be necessary when the polymer dispersions are based on polyurethane-ureas.

U.S. Pat. No. 4,385,137 also discloses improving the water resistance of existing aqueous dispersions containing chemically incorporated sulfonate groups by treating the dispersions with a cation exchange resin to replace the alkali metal or ammonium cations initially present with silver, monovalent copper or divalent cations. Finally U.S. Pat. No. 4,293,474 discloses aqueous polyurethane-urea dispersions containing both ionic and nonionic hydrophilic groups in admixture with electrolytes and U.S. Pat. No. 4,171,491 discloses the coagulation of aqueous polyurethane dispersions by treatment with electrolytes.

Even though methods are available for improving the hydrolytic stability or water resistance of aqueous polyurethane-urea dispersions there is still a need for a simple method of improving the hydrolytic stability of existing, fully prepared dispersions.

Accordingly, it is an object of the present invention to provide aqueous polyurethane-urea dispersions which may be used to prepare coatings having improved hydrolytic stability.

It is an additional object of the present invention to provide aqueous polyurethane-urea dispersions which may be used to prepare coatings having excellent chemical resistance, abrasion resistance, toughness, tensile strength, resistance to water swell, elasticity and durability.

It is a further object of the present invention to be able to post treat existing aqueous polyurethane-urea-dispersions which may then be used to prepare coatings having improved hydrolytic stability.

Surprisingly, it has been found that these objectives may be achieved according to the present invention as hereinafter described.

SUMMARY OF THE INVENTION

The present invention is directed to a process for the preparation of aqueous polyurethane-urea dispersions with improved hydrolytic stability by (a) forming an aqueous polyurethane-urea dispersion optionally by chain extending an aqueously dispersed isocyanate-terminated prepolymer containing (i) about 5 to 120 milliequivalents, per 100 grams of polyurethane-urea, of chemically incorporated anionic groups wherein at least about 50% of said anionic groups are carboxylic acid groups neutralized with volatile organic bases and (ii) up to about 10% by weight, based on the weight of said polyurethane-urea, of lateral and/or terminal hydrophilic chains containing ethylene oxide units, (b) converting the volatile, organic base-neutralized carboxylic acid groups to nonvolatile cation-neutralized carboxylate groups by adding alkali metal salts of organic or inorganic acids having a pKa greater than 0 to the aqueous polyurethane-urea dispersion of (a) or, in the case of aqueous polyurethane-urea dispersions prepared by chain extending isocyanate-terminated prepolymers satisfying the requirements of (a)(i) in the aqueous phase, by adding the alkali metal salts to the aqueous polyurethane-urea dispersion of (a) or to the aqueous medium used for dispersing the isocyanate-terminated prepolymer either before or after dispersing the prepolymer therein, in an amount sufficient to displace at least a portion of the volatile organic bases and, optionally, (c) removing the volatile organic bases by distillation, optionally under reduced pressure.

DETAILED DESCRIPTION OF THE INVENTION

In accordance with the present invention, aqueous polyurethane-urea dispersions containing carboxylate groups neutralized with volatile organic bases are formed in known manner using conventional starting materials. Any of the known processes and starting materials may be used for preparing the dispersions with the only requirement being that the polyurethane-ureas contain chemically incorporated carboxylic acid groups neutralized with volatile organic bases. Nonionic hydrophilic groups may also be present as well as other types of ionic groups such as sulfonate groups. These other ionic groups may be neutralized with either volatile organic bases or even with the nonvolatile alkali metal salts disclosed hereinafter. Even a portion of the incorporated carboxylic acid groups may already be neutralized with these alkali metal salts provided that the polyurethane-ureas also contain carboxylic acid groups neutralized with volatile organic bases.

The fully prepared dispersions are treated in accordance with the present invention by adding specific alkali metal salts and preferably removing the volatile organic bases by distillation. It is possible when certain processes are used for preparing the aqueous dispersions to add the alkali metal salts before the isocyanate-terminated prepolymers are chain extended to form the aqueous polyurethane-urea dispersions.

The aqueous polyurethane-urea dispersions are preferably prepared by a two-stage process wherein an isocyanate-terminated prepolymer is formed in the first stage by reacting an excess of a polyisocyanate with an isocyanate-reactive component as discussed in more detail hereinafter. The isocyanate-terminated prepolymer is then chain extended in a second stage to form the polyurethane-urea either before, during or after being mixed with an aqueous medium. However, it is possible to prepare the polyurethane-ureas in a one-step process in accordance with U.S. Pat. No. 3,479,310 to be discussed hereinafter, even though the formation of a prepolymer is preferred when conducting this process.

Examples of suitable polyisocyanates to be used in preparing the isocyanate-terminated prepolymers in accordance with the present invention are organic diisocyanates represented by the general formula

in which R represents an organic group obtainable by removal of the isocyanate groups from an organic diisocyanate having a molecular weight of from about 112 to 1,000, and preferably from about 140 to 400. Diisocyanates preferred for the process according to the invention are those represented by the general formula indicated above in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms. Examples of the organic diisocyanates which are particularly suitable for the process include tetramethylene diisocyanate, 1,6-hexamethylene diisocyanate, dodecamethylene diisocyanate, cyclohexane-1,3-and -1,4-diisocyanate, 1-isocyanato-3-isocyanatomethyl-3,5,5-trimethyl-cyclohexane (isophorone diisocyanate or IPDI), bis-(4-isocyanatocyclohexyl)-methane, 1,3- and 1,4-bis-(isocyanatomethyl)cyclohexane, bis-(4-isocyanato-3-methyl-cyclohexyl)-methane and $\alpha,\alpha,\alpha',\alpha'$-tetramethyl-xylylene diisocyanate. Mixtures of diisocyanates can, of course, be used. Preferred diisocyanates are 1,6-hexamethylene diisocyanate, isophorone diisocyanate and bis-(4-isocyanatocyclohexyl)-methane methane with bis-(4-isocyanatocyclohexyl)-methane being especially preferred.

In addition to the organic diisocyanates containing aliphatically- and/or cycloaliphatically-bound isocyanate groups previously set forth, it is also possible in accordance with the present invention to use aromatic diisocyanates of the above formula wherein R represents a difunctional aromatic hydrocarbon radical having from 6 to 15 carbon atoms. Suitable aromatic diisocyanates include 2,4-diisocyanato toluene, 2,6-diisocyanato toluene, mixtures of these isomers, 4,4'-diisocyanato diphenyl methane and its isomeric mixtures with 2,4'- and optionally 2,2'-diisocyanato diphenyl methane, and 1,5-diisocyanato naphthalene.

When aromatic diisocyanates are exclusively used to prepare prepolymers, the terminal isocyanate groups of the prepolymer are aromatically-bound, and due to the higher rate of reactivity for aromatically-bound isocyanate groups when compared to aliphatically- or cycloaliphatically-bound isocyanate groups, some of the known processes to be discussed hereinafter for converting the prepolymers into polyurethane-ureas in the second stage of the two-stage process cannot be conducted in large scale applications with prepolymers having aromatically-bound, terminal isocyanate groups, especially when the second step is conducted in the presence of an aqueous medium. However when mixtures of aromatic and nonaromatic diisocyanates are used and when both of the isocyanate groups of the aromatic diisocyanate are substantially incorporated into the backbone of the prepolymers, then the prepolymers may be prepared by any of the methods to be discussed hereinafter.

One method of preparing the prepolymers containing internal aromatic diisocyanates is to form an OH-terminated prepolymer which is subsequently capped with an organic diisocyanate containing aliphatically- and/or cycloaliphatically-bound isocyanate groups. However, it is also possible to prepare the prepolymers containing internal, aromatic diisocyanates in one step by adding the isocyanate-reactive component to a mixture of the aromatic diisocyanate and the organic diisocyanate containing aliphatically- and/or cycloaliphatically-bound isocyanate groups. Due to the higher reactivity of the aromatic diisocyanates, they will generally react preferentially and be substantially incorporated into the backbone of the prepolymer.

The organic compounds containing at least two isocyanate-reactive groups which are reacted with the previously described organic diisocyanates to prepare the isocyanate-terminated prepolymers can be divided into two groups, i.e., high molecular weight compounds with molecular weights from 400 to about 6,000, preferably from 400 to about 3,000, and low molecular weight compounds with molecular weights below 400. Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred.

Suitable polyester polyols include reaction products of dihydric alcohols and dibasic carboxylic acids. Instead of free dicarboxylic acids, the corresponding dicarboxylic acid anhydrides or dicarboxylic acid esters of lower alcohols or mixtures thereof may be used for preparing the polyesters. The dicarboxylic acids may be aliphatic, cycloaliphatic, aromatic and/or heterocyclic and they may be substituted, e.g. by halogen atoms, and/or unsaturated. The following are mentioned as examples: succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid and dimeric fatty acids such as oleic acid, dimethyl terephthalate and bisglycoterephthalate. Suitable dihydric alcohols include ethylene glycol, propylene glycol-(1,2) and -(1,3), butylene glycol-(1,4) and -(1,3), hexanediol-(1,6), octanediol-(1,8), neopentyl glycol, cyclohexanedimethanol (1,4-bis-hydroxymethylcyclohexane), 2-methyl-1,3-propane diol, 2,2,4-trimethyl -1,3-pentanediol, triethylene glycol, tetraethylene glycol, polyethylene glycol, dipropylene glycol, polypropylene glycol, dibutylene glycol and polybutylene glycol. The polyesters may also contain a proportion of carboxyl end groups. Polyesters of lactones, e.g. ϵ-caprolactone, or hydroxycarboxylic acids, e.g. ω-hydroxycaproic acid, may also be used.

Polycarbonates containing hydroxy groups include those known per se such as the products obtained from the reaction of diols such as propanediol-(1,3), butanediol-(1,4) and/or hexanediol-(1,6), diethylene glycol, triethylene glycol or tetraethylene glycol with diarylcarbonates, e.g. diphenylcarbonate, or phosgene.

Suitable polyether polyols are obtained in known manner by the reaction of the starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. It is preferred that the polyethers do not contain more than about 10% by weight of ethylene oxide units. Most preferably, polyethers obtained without the addition of ethylene oxide are used. Suitable starting compounds containing reactive hydrogen atoms include water and the dihydric alcohols set forth for preparing the polyester polyols.

Polyethers modified by vinyl polymers are also suitable for the process according to the invention. Products of this kind may be obtained by polymerizing, e.g. styrene and acrylonitrile in the presence of polyethers (U.S. Pat. Nos. 3,383,351; 3,304,273; 3,523,095; 3,110,695 and German Pat. No. 1,152,536).

Among the polythioethers which should be particularly mentioned are the condensation products obtained from thiodiglycol on its own and/or with other glycols, dicarboxylic acids, formaldehyde, aminocarboxylic acids or amino alcohols. The products obtained are either polythio-mixed ethers, polythioether esters or polythioether ester amides, depending on the co-components.

Suitable polyacetals include the compounds which can be prepared from aldehydes, e.g. formaldehyde, and glycols such as diethylene glycol, triethylene glycol, ethoxylated 4,4'-dihydroxydiphenyl-dimethylmethane, and hexanediol-(1,6). Polyacetals suitable for the purpose of the invention may also be prepared by the polymerization of cyclic acetals.

Suitable polyhydroxy polyester amides and polyamides include the predominantly linear condensates obtained from polybasic saturated and unsaturated carboxylic acids or their anhydrides and polyvalent saturated or unsaturated aminoalcohols, diamines, polyamines and mixtures thereof.

Suitable monomers for producing hydroxy-functional polyacrylates include acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate and 2-isocyanatoethyl methacrylate.

The compositions may also contain a low molecular weight isocyanate-reactive component having an average molecular weight of up to 400. The low molecular weight compounds which may optionally be used in combination with the high molecular weight isocyanate-reactive compounds for the preparation of the isocyanate-terminated prepolymers include the dihydric alcohols which have been described for the preparation of the polyester polyols; diamines such as diaminoethane, 1,6-diaminohexane, piperazine, 2,5-dimethylpiperazine, 1-amino-3-aminomethyl-3,5,5-trimethylcyclohexane (isophorone diamine or IPDA), bis-(4-aminocyclohexyl)-methane, bis-(4-amino-3-methylcyclohexyl)-methane, 1,4-diaminocyclohexane, 1,2-propylene diamine; hydrazine; amino acid hydrazides; hydrazides of semicarbazidocarboxylic acids; bis-hydrazides; bis-semicarbazides and the like. The dihydric alcohols are the preferred low molecular weight isocyanate-reactive component for preparing the isocyanate-terminated prepolymers.

In addition to the above-mentioned components which are preferably difunctional in the isocyanate polyaddition reaction, monofunctional and even small proportions of trifunctional and higher functional components generally known in polyurethane chemistry, such as trimethylolpropane, may be used in special cases in which slight branching of the isocyanate-terminated prepolymer is desired. However, these prepolymers should be substantially linear and this may be achieved by maintaining the average functionality of the prepolymer starting components below about 2.1.

In order to enable the polyurethane-urea to be stably dispersed in an aqueous medium, anionic or potential anionic groups and, optionally, lateral or terminal, hydrophilic ethylene oxide units are chemically incorporated into the polyurethane-urea. The anionic or potential anionic groups are incorporated in an amount sufficient to provide an anionic group content of about 5 to 120 milliequivalents, preferably about 10 to 80 milliequivalents, more preferably about 10 to 60 milliequivalents and most preferably about 10 to 30 milliequivalents per 100 g of polyurethane-urea. The content of hydrophilic ethylene oxide units may be up to about 10%, preferably up to about 8%, more preferably about 1 to 6% and most preferably about 2 to 6%, by weight, based on the weight of the polyurethane-urea. In addition, up to about 75% of the allowable, chemically incorporated, hydrophilic ethylene oxide units may be replaced by the known nonionic, external emulsifiers such as those of the alkaryl type such as polyoxyethylene nonyl phenyl ether or polyoxyethylene octyl phenyl ether; those of the alkyl ether type such as polyoxyethylene lauryl ether or polyoxyethylene oleyl ether; those of the alkyl ester type such as polyoxyethylene laurate, polyoxyethylene oleate or polyoxyethylene stearate: and those of the polyoxyethylene benzylated phenyl ether type.

The anionic or potential anionic groups may be chemically incorporated into the isocyanate-terminated prepolymer or may be chemically incorporated through the chain extender which is used to form the polyurethane urea from the prepolymer. Suitable compounds for incorporating these groups include (i) monoisocyanates or diisocyanates which contain anionic or potential anionic groups and (ii) compounds which are monofunctional or difunctional in the isocyanate-polyaddition reaction and contain anionic or potential anionic groups.

The anionic groups are formed by neutralizing the corresponding potential ionic groups either prior to, during or after formation of the polyurethane-urea. When the potential anionic groups are neutralized prior to their incorporation into the polyurethane-urea, the anionic groups are incorporated directly. When neutralization is performed subsequent to forming the polyurethane-urea, potential ionic groups are incorporated.

The anionic groups to be used in accordance with the present invention are carboxylate groups, however a portion of the carboxylate groups, i.e. up to about 50%, preferably up to about 20%, based on equivalents may be replaced by other known anionic-groups such as sulfonate groups. Most preferably, substantially all of the anionic groups are carboxylate groups.

Suitable compounds for incorporating the carboxylate or sulfonate groups are described in U.S. Pat. Nos. 3,479,310, 4,108,814 and 4,303,774, the disclosures of which are herein incorporated by reference. The preferred sulfonate groups for incorporation into the isocyanate-terminated prepolymer are the diol sulfonic acids or the diol sulfonates disclosed in U.S. Pat. No. 4,108,814.

The neutralizing agents for converting the potential anionic groups to anionic groups are more fully discussed hereinafter. Within the context of this invention, the term "neutralizing agents" is meant to embrace all types of agents which are useful for converting potential anionic groups to anionic groups.

The preferred carboxylate groups for incorporation into the isocyanate-terminated prepolymer are derived from hydroxycarboxylic acids of the general formula:

(HO)$_x$Q(COOH)$_y$ wherein
Q represents a straight or branched, hydrocarbon radical containing 1 to 12 carbon atoms, and
x and y represent values from 1 to 3.

Examples of these hydroxycarboxylic acids include citric acid and tartaric acid.

The preferred acids are those of the above-mentioned formula wherein x=2 and y=1. These dihydroxy alkanoic acids are described in U.S. Pat. No. 3,412,054, herein incorporated by reference. The preferred group of dihydroxy alkanoic acids are the α,α-dimethylol alkanoic acids represented by the structural formula

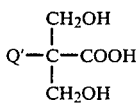

wherein Q' is hydrogen or an alkyl group containing 1 to 8 carbon atoms. The most preferred compound is α,α-dimethylol propionic acid, i.e., when Q' is methyl in the above formula.

When incorporating the anionic or potential anionic groups through the chain extender used to convert the isocyanate-terminated prepolymer to the polyurethane-urea in the second stage of the two-stage process, it is preferred to use amino functional compounds containing anionic or potential anionic groups such as the diamino carboxylic acids or carboxylates disclosed in U.S. Pat. No. 3,539,483 or salts of 2,6-diamino-hexanoic acid. When sulfonate groups are desired they may be incorporated through the chain extenders using salts of isethionic acid or preferably diamino sulfonates of the formula H$_2$N—A—NH—B—SO$_3^\ominus$ wherein
A and B represent aliphatic hydrocarbon radicals containing 2 to 6 carbon atoms, preferably ethylene groups.

Whether the anionic groups are incorporated into the polyurethane-urea via the prepolymer or the chain extender is not critical. Therefore, the anionic groups may exclusively be incorporated via the prepolymer or via the chain extender or a portion of the anionic groups may be introduced according to each alternative. However, it is preferred to introduce the anionic groups via the prepolymer since this allows a wider range of process variations in preparing the polyurethane-urea dispersion.

Suitable compounds for incorporating the lateral or terminal, hydrophilic ethylene oxide units may be either monofunctional or difunctional in the context of the isocyanate-polyaddition reaction and include (i) diisocyanates which contain lateral, hydrophilic ethylene oxide units, (ii) compounds which are difunctional in the isocyanate-polyaddition reaction and contain lateral, hydrophilic ethylene oxide units, (iii) monoisocyanates which contain terminal, hydrophilic ethylene oxide units, (iv) compounds which are monofunctional in the isocyanate-polyaddition reaction and contain terminal, hydrophilic ethylene oxide units, and (v) mixtures thereof.

The preferred difunctional hydrophilic components having lateral hydrophilic chains containing ethylene oxide units include compounds corresponding to the following general formula:

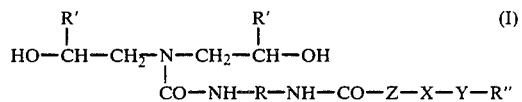

and/or compounds corresponding to the following general

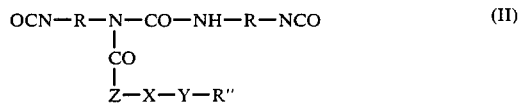

Preferred difunctional hydrophilic components are those corresponding to general formula (I) above.

In general formula (I) and (II) above,

R represents a difunctional radical of the type obtained by removing the isocyanate groups from a diisocyanate corresponding to the general formula:

$$R(NCO)_2$$

of the above-mentioned type;

R' represents hydrogen or a monovalent hydrocarbon radical containing from 1 to 8 carbon atoms, preferably a hydrogen atom or a methyl group:

R'' represents a monovalent hydrocarbon radical having from 1 to 12 carbon atoms, preferably an unsubstituted alkyl radical having from 1 to 4 carbon atoms;

X represents the radical obtained by removal of the terminal hydroxyl group from a polyalkylene oxide chain having from about 5 to 90 chain members, preferably from about 20 to 70 chain members, of which at least about 40%, preferably at least about 65%, comprises ethylene oxide units and the remainder comprises other alkylene oxide such as propylene oxide, butylene oxide or styrene oxide units, preferably propylene oxide units;

Y represents oxygen or —NR'''— wherein R''' has the same definition as R'', and

Z represents a radical which corresponds to Y, but may additionally represent —NH—.

The compounds corresponding to general formulae (I) and (II) above may be produced by the methods according to U.S. Pat. Nos. 3,905,929 and 3,920,598 (the disclosures of which are herein incorporated by reference). In addition to the disclosures of these two patents, it is noted that instead of using the monofunctional polyether alcohols mentioned therein as starting materials, it is also possible to use those of the type where the polyether segment, in addition to ethylene oxide units, also contains up to 60% by weight based on polyether segment, of other alkylene oxide units such as propylene oxide, butylene oxide or styrene oxide units, preferably propylene oxide units. The presence of such "mixed polyether segments" may afford specific advantages in certain cases. These "mixed polyether segments" are described in U.S. Patent 4,190,566, the disclosure of which is herein incorporated by reference.

Other particularly preferred hydrophilic components for incorporating lateral or terminal hydrophilic chains containing ethylene oxide units include compounds corresponding to the following general formula:

$$H-Y'-X-Y-R''$$

and/or compounds corresponding to the following general formula:

$$OCN-R-NH-CO-Z-X-Y-R''$$

wherein

X, Y, Z, R and R'' are as defined above; and Y' corresponds in its meaning to Y, but may additionally represent —NH—.

Monofunctional polyethers are preferably used, but preferably only in molar quantities of 10%, based on the polyisocyanate used, to guarantee the required high molecular weight structure of the polyurethane-urea. In cases where relatively large molar quantities of monofunctional alkylene oxide polyethers are used, it is advantageous to also use trifunctional starting compounds, although the average functionality of the polymer starting components should preferably not exceed about 2.1 in order to obtain substantially linear prepolymers.

The monofunctional hydrophilic components are produced in accordance with the processes described in U.S. Pat. Nos. 3,905,929 and 3,920,598 by alkoxylating of a monofunctional starter, such as n-butanol, using ethylene oxide and optionally another alkylene oxide, for example propylene oxide. The resultant product may be optionally further modified (although this is less preferred) by reaction with excess quantities of diisocyanates or by reaction with ammonia to form the corresponding primary amino-polyethers.

The isocyanate-terminated prepolymers of the present invention are prepared by reacting the polyisocyanate component with the high molecular weight organic component containing at least 2 isocyanate-reactive groups and the following optional components, i.e. the low molecular weight organic component containing at least 2 isocyanate-reactive groups, the component containing at least one anionic group or at least one potential anionic group and the component containing the hydrophilic ethylene oxide units. The potential anionic groups are groups which may be converted to anionic groups by treatment with neutralizing agents. The ratio of isocyanate groups to isocyanate-reactive groups is maintained between about 1.1 to 3, preferably about 1.2 to 2 and most preferably about 1.3 to 1.5 on an equivalent basis. The above components may be reacted simultaneously or sequentially to produce the isocyanate-terminated prepolymer. Simultaneous reaction will lead to the production of random copolymers, whereas a sequential-type reaction will lead to the production of block copolymers. The order of addition of the compounds containing isocyanate-reactive hydrogen(s) in the sequential-type reaction process is not critical: however, during the reaction of these compounds it is especially preferred to maintain an excess of isocyanate groups in order to control the molecular weight of the prepolymer and prevent high viscosities.

The reaction temperature during prepolymer production is normally maintained below about 150° C., preferably between about 50° and 130° C. The reaction is continued until the content of unreacted isocyanate groups decreases to the theoretical amount or slightly below. The finished prepolymer should have a free isocyanate content of about 1 to 8%, preferably about 1 to 5% by weight, based on the weight of prepolymer solids. It is possible to conduct the prepolymer reaction in the presence of catalysts known to accelerate the reaction between isocyanate groups and isocyanate-reactive groups, such as organo-tin compounds, tertiary amines, etc.; however, the use of a catalyst is generally not necessary and it is often preferred to conduct the reaction without a catalyst.

The prepolymers may be prepared in the presence of solvent provided that the solvent is substantially nonreactive in the context of the isocyanate-polyaddition reaction. The solvents are generally organic and may be comprised essentially of carbon and hydrogen with or without other elements such as oxygen or nitrogen. While it may not be necessary to employ a solvent during formation of the isocyanate-terminated prepolymer, the use of a solvent may be desirable to maintain the reactants in the liquid state as well as to permit better temperature control during the reaction by serving as a heat sink and, if desired, as a refluxing medium.

Solvents which may be employed include dimethylformamide, esters, ethers, ketoesters, ketones, e.g., methyl ethyl ketone and acetone, glycolether-esters, chlorinated hydrocarbons, aliphatic and alicyclic hydrocarbon-substituted pyrrolidinones, e.g., N-methyl-2-pyrrolidinone, hydrogenated furans, aromatic hydrocarbons, and the like, and mixtures thereof. The amount of solvent employed, if any, can vary widely. The amount of solvent employed should be sufficient to provide a prepolymer solution having a sufficiently low viscosity to enhance the formation of the polyurethane-urea dispersion of this invention; however, the solutions may be successfully employed in forming the dispersions even though the viscosity of the solution is relatively high at the temperature of the dispersion. Such viscosities may be as low as 100 centipoise or above 10,000 centipoise, and only mild agitation need be employed to form the dispersion, even in the absence of an external emulsifying agent. Often about 0.01 to 10 parts by weight of solvent, preferably about 0.02 to 2 parts by weight of solvent, per part by weight of the prepolymer can be used. However, the presence of a solvent for the prepolymer or the polyurethane-urea is not necessary to provide a stable, aqueous dispersion. Often, when solvent is employed during the preparation of the isocyanate-terminated prepolymer and/or the polyurethane-urea it is desirable to remove at least a portion of the solvent from the aqueous dispersion. Advantageously, the solvent to be removed from the dispersion has a lower boiling point than water and thus can be removed from the dispersion by, for example, distillation. The removal of the low boiling solvent is desirably conducted under conditions which are not deleterious to the polyurethane-urea such as by vacuum distillation or thin film evaporation. A solvent having a higher boiling point than water such as dimethyl formamide, N-methyl-2-pyrrolidinone, and the like may be employed, in which case, the higher boiling solvent is generally retained in the polyurethane-urea aqueous polymer dispersion to enhance the coalescence of the polyurethane-urea particles during film formation.

In order to convert the carboxylic acid groups to carboxylate groups either before, during or after their incorporation into the polyurethane-ureas, volatile organic bases are used to form the counterions of the anionic groups. Volatile organic bases are those wherein at least about 90% of the organic bases used to form the counterions of the anionic groups may be removed from the dispersion by distillation after subsequent treatment with the nonvolatile cations.

Suitable volatile organic bases for neutralizing the potential anionic groups are the primary, secondary or tertiary amines. Of these the trialkyl-substituted tertiary amines are preferred. Examples of these amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethyl-ethanol amine, N,N-diethylethanol amine, triethanol amine, N-methyl-diethanol amine, dimethylaminopropanol, 2-methoxyethyldimethyl amine, N-hydroxyethylpiperazine, 2-(2-dimethylaminoethoxy)-ethanol and 5-diethylamino-2-pentanone. The most preferred tertiary amines are those which do not contain active hydrogen(s) as determined by the Zerewitinoff test since they are capable of reacting with the isocyanate groups of the prepolymers which can cause gelation, the formation of insoluble particles or chain termination.

The more volatile tertiary amines are especially advantageous since they do not take part in the isocyanate-polyaddition reaction and they may also be more easily removed from the finished dispersion by distillation. When isocyanate-terminated prepolymers containing potential anionic groups are formed, it would be difficult to neutralize these groups prior to dispersion in water with primary or secondary amines due to the fact that these amines may react with the free isocyanate groups of the prepolymer. In this context, these amines act more like chain terminators or chain extenders than neutralizing agents, and make the subsequent high molecular weight build-up during the aqueous chain extension step more difficult and less predictable. Thus, if primary and secondary amines are used, they should preferably be used as neutralizing agents prior to the formation of the prepolymer, i.e. when the potential anionic groups are converted to anionic groups prior to their incorporation into the prepolymer. However, the tertiary amines are preferred even when neutralization is conducted in this manner.

When the potential anionic groups of the prepolymer are neutralized, they provide hydrophilicity to the prepolymer and better enable it to be stably dispersed in water. The potential or unneutralized anionic groups do not provide this degree of hydrophilicity. Accordingly, a sufficient amount of the potential ionic groups must be neutralized so that when combined with the optional hydrophilic ethylene oxide units, the polyurethane-urea final product will be a stable dispersion. Generally, at least about 75%, preferably at least about 90%, of the potential anionic groups are neutralized to the corresponding anionic groups. Larger amounts of potential ionic groups may remain unneutralized: however, there are no advantages to be gained from large quantities of unneutralized potential anionic groups and their presence could be detrimental by minimizing the improvements in hydrolytic stability which are obtained in accordance with the present invention. When smaller amounts of potential ionic groups are incorporated, it may be necessary to neutralize substantially all of these groups to obtain the desired amount of hydrophilicity. No firm guidelines can be given as to the amount of anionic groups needed, since the dispersibility of the polyurethane-urea depends on many factors including, but not limited to, the amount of hydrophilicity provided by the ethylene oxide units, the desired particle size and the application requirements.

The initial neutralization of the carboxylic acid groups may be conducted (1) prior to prepolymer formation by treating the component containing the potential ionic group(s)
(2) after prepolymer formation, but prior to dispersing the prepolymer or
(3) in some cases, by adding the volatile organic base to all or a portion of the dispersing water. The second option is preferred. The reaction between the volatile organic bases and the carboxylic acid groups may be conducted between about 20° C. and 150° C., but is normally conducted at temperatures below about 100° C., preferably between about 30° and 80° C. and most preferably between about 50° and 70° C., with agitation of the reaction mixture.

The isocyanate-terminated prepolymers may be converted into aqueous polyurethane-urea dispersions in accordance with the methods known in polyurethane chemistry. It is also possible in accordance with the present invention to mix dispersions prepared by the different methods set forth hereinafter. In addition, it is possible to prepare one dispersion neutralized with volatile organic bases and a second dispersion, prepared by the same or a different process, neutralized with nonvolatile cations which may subsequently be mixed either before or after the process according to the present invention is conducted.

According to one process for preparing the polyurethane-urea dispersions, the isocyanate-terminated prepolymer is prepared in the melt and subsequently dissolved in a suitable solvent and chain extended to form a polyurethane-urea. It is also possible in accordance with this process to form the polyurethane-urea by the one-shot process wherein the prepolymer-forming reactants and chain extender are all reacted in one step rather than by initially forming a prepolymer. The solution of the polyurethane-urea is then mixed with water and the solvent is removed by distillation to produce the aqueous polyurethane-urea dispersion. This process is disclosed in U.S. Pat. No. 3,479,310, herein incorporated by reference, and may be conducted with any of the polyisocyanates set forth as suitable for the preparation of the isocyanate-terminated prepolymers including the aromatic diisocyanates. However, the process is limited to the production of substantially linear polyurethane-ureas since cross-linked polyurethane-ureas may gel when prepared in the organic phase.

Polyurethane-urea dispersions may also be prepared in accordance with U.S. Pat. No. 3,756,992 by converting the terminal isocyanate groups of a hydrophilic prepolymer to acylated amino groups by reaction with urea, ammonia or other suitable compounds. The acylated amino end groups are then converted to methylol end groups by reaction with formaldehyde or related compounds either before, during, or after the addition of water. The methylol end groups are then linked through methylene bridges by heating the dispersions. This process may be conducted with any of the polyisocyanates set forth as suitable for the preparation of isocyanate-terminated prepolymers including the aromatic diisocyanates.

An additional method of forming the aqueous polyurethane-urea dispersions is by conducting the chain extension of the isocyanate-terminated prepolymers in an aqueous medium. In one embodiment hydrophilic, isocyanate-terminated prepolymers are mixed with at least partially blocked, diamine or hydrazine chain extenders in the absence of water and the mixture is then mixed with water which releases the blocking agent to allow chain extension of the prepolymers. Processes of this type are disclosed in German Offenlegungsschrift No. 2,725,589 or U.S. application Ser. No. 447,575 filed Dec. 7, 1982, and in U.S. Pat. Nos. 4,269,748, 4,192,937 and 4,292,226. Aromatic diisocyanates may also be used to prepare the isocyanate-terminated prepolymers to be used according to these processes; however, prepolymers containing aliphatically- and/or cycloaliphatically-bound terminal isocyanate groups are preferred.

The preferred method of conducting the chain extension of the isocyanate-terminated prepolymer in an aqueous medium is by dispersing the prepolymer in water and subsequently adding the chain extender. To form the dispersion either water is added to the prepolymer or preferably the prepolymer is added to water. Prepolymers containing aliphatically- and/or cycloaliphatically bound terminal isocyanate groups are especially preferred when chain extension is conducted in the presence of an aqueous medium. If it is desired to chain extend prepolymers containing aromatically-bound, terminal isocyanate groups by this method, then it is preferable to block the isocyanate groups prior to contact with water as disclosed in U.S. Pat. No. 4,387,181.

It is also possible to prepare cross-linked dispersions in accordance with this process by using chain extenders having an average functionality greater than 2 in accordance with U.S. Pat. Nos. 4,408,008 or 4,203,883. If the prepolymer is dispersed by adding water to the prepolymer with agitation, the viscosity of the mixture increases significantly, since initially the organic phase is continuous. As the addition of water is continued, a point is reached where a phase change occurs and the aqueous phase becomes continuous and the viscosity decreases. The remaining portion of the water is then added. If the neutralizing agent is in the dispersing water, then it is important that sufficient anionic groups be present to produce a stable dispersion at the point of phase change when combined with the hydrophilic effect of the ethylene oxide units. This problem may be obviated by adding all of the neutralizing agent with a portion of the dispersing water which is insufficient to cause the phase change, followed by the addition of the remaining water. This problem may also be overcome by incorporating excess hydrophilic ethylene oxide units and/or potential anionic groups into the prepolymer, or by using an excess of the volatile neutralizing agent. However, these latter methods are less preferred since they may minimize the improvements in hydrolytic stability which are obtained in accordance with the present invention.

When the prepolymer is added to the water significant increases in viscosity do not occur. In addition, if alternative 3 is used for neutralization, all of the neutralization agent is present in the water prior to the addition of the prepolymer. In addition, the problems discussed in the preceding paragraph are not encountered when the initial neutralizing agent is present in the dispersing water since all of the water is initially present.

The prepolymer is usually added in increments to the water or water-neutralizing agent mixture. The aqueous mixture is preferably agitated during the addition of the prepolymer to assist in forming the dispersion. Any low boiling solvent present during prepolymer formation may be removed prior to dispersing the prepolymer; however, it is preferred to remove the solvent after the dispersion is formed since the solvent, especially water miscible solvents will facilitate the formation of the dispersion and, also, the subsequent reaction with the amine chain extenders. The presence of solvent is especially preferred when the dispersion is formed by adding water to the prepolymer since it helps to reduce the viscosity peak normally encountered with this process.

After the formation of the dispersed, isocyanate-terminated prepolymer the amine chain extenders should be added before the reaction of the terminal isocyanate groups with water proceeds to any significant extent, normally within about 30 minutes, preferably within about 15 minutes depending on the temperature.

The aqueous polyurethane-urea dispersions of the present invention are formed by reacting the isocyanate-terminated prepolymers with a polyamine or a mixture of polyamines in accordance with the previously described processes. The average functionality of the amine, i.e., the number of amine nitrogens per molecule, should be between about 2 and 6, preferably between about 2 and 4 and most preferably between about 2 and 3. The desired functionalities can be obtained by using mixtures of polyamines. For example, a functionality of 2.5 can be achieved by using equimolar mixtures of diamines and triamines. A functionality of 3.0 can be achieved either by using (1) triamines,
(2) equimolar mixtures of diamines and tetramines,
(3) mixtures of 1 and 2, or
(4) any other suitable mixtures.

These other suitable mixtures for obtaining the desired functionalities will be readily apparent to those of ordinary skill in the art.

Suitable amines are essentially hydrocarbon polyamines containing 2 to 6 amine groups which have isocyanate-reactive hydrogens according to the Zerewitinoff test, e.g., primary or secondary amine groups. The polyamines are generally aromatic, aliphatic or alicyclic amines and contain between about 1 to 30 carbon atoms, preferably about 2 to 15 carbon atoms, and most preferably about 2 to 10 carbon atoms. These polyamines may contain additional substituents provided that they are not as reactive with isocyanate groups as the primary or secondary amines. Examples of polyamines for use in the present invention include the amines listed as low molecular weight compounds containing at least two isocyanate-reactive amino hydrogens, and also diethylene triamine, triethylene tetramine, tetraethylene pentamine, pentaethylene hexamine, N,N,N-tris-(2- aminoethyl)amine, N-(2-piperazinoethyl)-ethylene diamine, N,N'-bis-(2-aminoethyl)-piperazine, N,N,N'-tris-( 2-aminoethyl)ethylene diamine, N-[N-(2-aminoethyl)-2-aminoethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl)-amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl)amine, N,N'-bis-(3-aminopropyl)-ethylene diamine and 2,4-bis-(4'-aminobenzyl)-aniline. Preferred polyamines are 1-amino-3-aminomethyl-3,5,5-trimethyl-cyclohexane (isophorone diamine or IPDA), bis-(4-aminocyclohexyl)-methane, bis-(4-amino-3-methylcyclohexyl)-methane, 1,6-diaminohexane, ethylene diamine, diethylene triamine, triethylene tetramine, tetraethylene pentamine and pentaethylene hexamine. Polyamines containing tertiary amino groups are less preferred in accordance with the present invention.

The amount of polyamine chain extender to be used in accordance with the present invention is dependent upon the number of terminal isocyanate groups in the prepolymer. Generally, the ratio of terminal isocyanate groups of the prepolymer to the amino hydrogens of the polyfunctional amine is between about 1.0:0.6 and 1.0:1.1, preferably between about 1.0:0.8 and 1.0:0.98 on an equivalent basis. Lesser amounts of the polyamine will allow for too much undesired reaction of the isocyanate groups with water, while an undue excess may lead to products with undesirably low molecular weights. For the purposes of these ratios a primary amino group is considered to have one amino hydrogen. For example, ethylene diamine has two equivalents of amino hydrogens, while diethylene triamine has three equivalents.

The reaction between the isocyanate-terminated prepolymer and the polyamine is generally conducted at temperatures from about 5° to 90° C., preferably from about 20° to 80° C., and most preferably from about 30° to 60° C. The reaction conditions are normally maintained until the isocyanate groups are essentially completely reacted. In order to reduce the presence of localized concentrations gradients when conducting the chain extension in an aqueous medium, the polyamine is preferably added in increments to the dispersed prepolymer which is normally agitated to ensure complete mixing of the polyamine throughout the aqueous medium. The polyamine may be added to the aqueous medium in its pure form or it may be dissolved or dispersed in water or an organic solvent. Suitable organic solvents are those previously described for use in preparing the isocyanate-terminated prepolymer.

In order to improve the hydrolytic stability of polyurethane-urea dispersions initially neutralized with volatile organic bases in accordance with the process of the present invention, specific alkali metal salts are used to replace the volatile organic bases as the neutralizing agents for the carboxylic acid groups. The alkali metal salts are admixed with either the chain extended, polyurethane-urea dispersion or to the initially neutralized, dispersed prepolymers prior to chain extension, and the displaced, volatile organic bases are subsequently optionally removed by distillation.

Suitable alkali metal salts are those based on anions of weak organic or inorganic acids having a pKa greater than 0, preferably greater than 5. The most preferred anions are those which do not remain in the dispersions such as hydroxides, carbonates, bicarbonates and hydrides. Preferred alkali metals are sodium, potassium and lithium, with sodium being particularly preferred. The most preferred salts are sodium carbonate and sodium bicarbonate.

In general, the process-according to the invention may be carried out by adding the alkali metal salts to polyurethane-urea dispersions containing anionic groups formed by neutralizing carboxylic acid groups with volatile organic bases. The alkali metal salts are added in an amount sufficient to displace at least a portion, preferably substantially all of the volatile organic bases used to neutralize the potential anionic groups, preferably carboxylic acid groups. Since films or coatings prepared from aqueous polyurethane-urea dispersions containing anionic groups neutralized with alkali metal salts possess better hydrolytic stability than corresponding films or coatings prepared from aqueous polyurethane-urea dispersions containing anionic groups neutralized by volatile organic bases the improvement in hydrolytic stability corresponds to the amount of volatile organic bases which are displaced by the alkali metal cations. Small excesses of the alkali metal salts may be used, but are not preferred, and large excesses may even be detrimental, especially in dispersions which rely substantially upon anionic groups to provide hydrophilicity.

It is also possible, although less preferred, to conduct the process at the prepolymer stage of the dispersion by adding the alkali metal salts to the dispersing water or by adding the alkali metal salts to the initially neutralized dispersed prepolymer prior to chain extention. Obviously, it is not possible to add the alkali metal salts to the dispersing water if the initial neutralization is to be conducted by adding the volatile organic bases to the dispersing water. In this case the alkali metal salts must be added to the dispersed prepolymer or, preferably, to the polyurethane-urea dispersion after chain extension. Generally, the addition of the alkali metal salts at the prepolymer stage is less effective since these salts can catalyze the water/isocyanate reaction, reducing the number of available NCO-groups for subsequent chain extension with polyamines. Accordingly, unless the prepolymers have low NCO contents, have blocked isocyanate groups or have been fully chain extended prior to dispersion in water, it is preferred to add the alkali metal salts to the fully chain extended polyurethane-urea dispersion.

While the process of the present invention may be carried by simply adding the alkali metal salts, it is prefer to also remove the volatile organic bases by distillation, preferably under reduced pressure, after chain extension to form the polyurethane-urea dispersions. The distillation may be carried out at temperatures of up to about 100° C., preferably at about 50° to 80° C. The temperature is dependent upon the pressure at which the distillation is conducted because the pressure affects the volatility of the volatile organic base. It is noted that the use of high temperatures for prolonged periods may affect the dispersion, e.g. by causing discoloration or in some cases, if nonionic hydrophilic groups are present, by causing coagulation of the dispersion due to the reduced effectiveness of these hydrophilic groups at elevated temperatures. Therefore, it is preferred to decrease the distillation temperature by operating under reduced pressure, i.e. at pressures as low as about 0.1 mm of Hg. The distillation may be carried out by simple heating or in conventional apparatuses such as falling film or thin layer evaporators.

The final product is a stable, aqueous dispersion of polyurethane-urea particles having a solids content of up to about 60% by weight, preferably about 15–60% by weight and most preferably about 30–45% by weight. However, it is always possible to dilute the dispersions to any minimum solids content desired. The particle size is generally below about 1.0 micron, and preferably between about 0.001 to 0.5 microns. The average particle size should be less than about 0.5 micron, and preferably between 0.01 to 0.3 microns. The small particle size enhances the stability of the dispersion and also leads to the production of films with high surface gloss.

Even though the polyurethane-urea dispersions of the subject application contain ionic groups they are largely unaffected by electrolytes if they also contain hydrophilic, ethylene oxide units. This provides, for example, for the acid-catalyzed cross-linking of the latex particles with formaldehyde or formaldehyde derivatives: similarly they may be pigmented with electrolyte-active pigments or dyes. Another property of the dispersions according to the present invention is that they may be coagulated which makes them suitable for processing into films permeable to water vapor simply by heating.

The dispersions may be blended with other dispersions, for example, with polyvinyl acetate, epoxy resins, polyethylene, polystyrene, polybutadiene, polyvinyl chloride, polyacrylate and copolymer plastics dispersions. The addition of known, chemically nonfixed, ionic emulsifiers is also possible but not preferred. Fillers, plasticizers, pigments, carbon black, silica sols and the known levelling agents, wetting agents, antifoaming agents, stabilizers, etc. may also be incorporated into the dispersions.

The dispersions of the polyurethane-ureas in water are generally stable, storable and transportable, and may be processed at a later stage, for example, by foaming. In general, they dry directly into dimensionally stable coatings, although formation of the end products may also be carried out in the presence of known cross-linking agents. Polyurethane-ureas having different properties may be obtained according to the chemical composition selected and to the urethane group content. Thus, it is possible to obtain soft, tacky compositions, and thermoplastic and elastomeric products having a variety of different hardnesses up to glass-hard duroplasts. The hydrophilicity of the products may also vary within certain limits. The elastomeric products may be thermoplastically processed at elevated temperatures, for example, at from about 100° to 180° C., providing they are not highly cross-linked.

The end products of the process are suitable for coating and impregnating woven and nonwoven textiles, leather, paper, wood, metals, ceramics, stone, concrete, bitumen, hard fibers, straw, glass, porcelain, plastics of a variety of different types, glass fibers for antistatic and crease-resistant finishing: as binders for nonwovens, adhesives, adhesion promoters, laminating agents, hydrophobizing agents, plasticizers; as binders, for example, for cork powder or sawdust, glass fibers, asbestos, paper-like materials, plastics or rubber waste, ceramic materials; as auxiliaries in textile printing and in the paper industry; as additives to polymers as sizing agents, for example, for glass fibers: and for finishing leather.

The dispersions may also be applied to a porous substrate which subsequently remains bonded to the end product, such as woven or nonwoven textile structures and fiber mats, felts or nonwovens, also paper webs, foam sheeting or split leather which by virtue of their absorbing action cause the coating to harden immediately. This is followed by drying and, optionally, pressing at elevated temperatures. However, drying may also be carried out on smooth, porous or nonporous materials, for example, metal, glass, paper, cardboard, ceramic materials, sheet steel, silicone rubber, aluminum foil, the end sheet structure subsequently being lifted off and used as such, or applied to a substrate using the reversal process by bonding, flame lamination or calendering. Application by the reversal process may be carried out at any time.

The properties of the end products may be modified by using vinyl polymers or active and inactive fillers. It is also possible to use, for example, polyethylene, polypropylene, polyvinyl acetate, ethylene/vinyl acetate copolymers which may optionally be (partially) hydrolyzed and/or grafted with vinyl chloride, styrene-butadiene copolymers, ethylene (graft) copolymers, polyacrylates, carbon black, silica, asbestos, talcum, kaolin, titanium dioxide and glass in the form of powder or in the form of fibers or cellulose. Depending upon the required property spectrum and the application envisaged for the final product, up to about 70%, based on total dry substance, these fillers may be present in the final product. Dyes or additives which influence flow properties may, of course, also be added.

Drying of the product obtained by various application techniques may be carried out either at room temperature or at elevated temperature. The drying temperature to be selected in each individual case, which is governed not only by the chemical compositions of the material, but above all by its moisture content, the drying time and the layer thickness, is readily determined by a preliminary test. For a given heating time, the drying temperature must always be below the solidification temperature.

Extremely hard polyurethane-ureas obtained from finely divided dispersions and sols are suitable for use as stoving lacquers and, in some cases, even as air-drying lacquers. They combine extreme hardness and elasticity with high gloss, favorable light stability and weather resistance.

These polyurethane dispersions are specifically suited for coatings on vinyl fabrics used in automotive seating and commercial upholstery. In these application areas, properties like plasticizer barrier effect, improved abrasion resistance and good hydrolytic and UV-resistance are of importance. They are also useful as coatings for textiles such as tarpaulins, specifically for military application where properties like excellent toughness and retained properties after aging are essential.

Business machine housings which are made from plastic materials and where solvent borne coatings can attack the surface are another important application for these aqueous polyurethane-urea dispersions. Additionally, they are excellently suited to coat bowling alleys, as chip resistant coatings in automotive applications, for furniture, aircraft, foil and paper. They are also valuable as a co-binder for acrylic dispersions to improve properties like alcohol resistance, flexibility and appearance of resulting coatings.

The invention is further illustrated but is not intended to be limited by the following examples in which all parts and percentages are by weight unless otherwise specified.

EXAMPLES

Example I 194.5 parts of a polyester diol (of adipic acid and 1,6-hexanediol having an OH-number of 134), 26.1 parts of neopentyl glycol, 20.4 parts of α,α-dimethylolpropionic acid, 8.2 parts of a polyether monoalcohol of n-butanol, ethylene oxide and propylene oxide (in a molar ratio 83:17) having an OH-number of 26 and 235.0 parts of N-methyl pyyrolidinone were combined and heated to 60° C. and stirred for 10 minutes. 250.5 parts of bis-(4-isocyanatocyclohexyl)methane were added to the homogeneous mixture which was then heated to 110° C. for 3 hr. The free isocyanate content was determined to be 3.5%. The prepolymer was cooled to 65° C. and then 15.1 parts of triethylamine and 8.2 parts of Surfonic N-300 (Jefferson Chemical Co., 1540 MW ethoxylated nonyl phenol) were added. The prepolymer was added to 571.0 parts of vigorously stirred distilled water (35° C.) over an 8 min. period. After 3 min. additional stirring a solution of 8.5 parts ethylenediamine, 7.0 parts isophorone diamine, 4.7 parts diethylenetriamine and 123.0 parts distilled water was added to the dispersion over a 6 min. period. The dispersion was heated to 70° C. and stirred at that temperature for 2 hours. The wet properties of the dispersion are given in Table I. Films were prepared on glass plates (10 mil wet film thickness) and dried and aged 1 week at room temperature. Hydrolytic stability was determined by comparing the stress/strain properties of the films prepared from this dispersion both prior to and after 1 week and 2 weeks storage at 70° C., 95% relative humidity. The results of hydrolytic stability (average of triplicate determinations) are listed in Table II.

Examples II–XVII

To aliquots of 400.0 parts of the dispersion described in Example I were added the salts listed in Table I. The samples were heated to 70° C. under reduced pressure (20 mm Hg) for 2–4 hours except for Examples II and XV which were only heated. After cooling to room temperature, the solids content of each was determined and adjusted with distilled water to 35.4%. The wet properties of the dispersions are given in Table I. Films were prepared of the samples that did not gel, and their hydrolytic stability was tested as in Example I. The results are listed in Table II.

TABLE I

Compositions and Wet Properties of Salt-Modified Dispersions

| Example | Salt | Amount, parts | Equiv. Salt/ Equiv. $CO_2$ | Viscosity[b] mPa.s | pH |
|---|---|---|---|---|---|
| I | — | 0.00 | 0.00 | 540 | 8.14 |
| II | $Na_2CO_3$ | 2.09 | 0.94 | 760 | 9.74 |
| III | $Na_2CO_3$ | 2.09 | 0.94 | 820 | 9.34 |
| IV | NaCl | 2.77 | 0.94 | 1080 | 7.89 |
| V | $NaOCOCH_3$ | 3.20 | 0.94 | 190 | 8.03 |
| VI | NaOH (1 N soln.) | 39.0 | 0.94 | 700 | 8.56 |
| VII | $Na_2SO_4$ | 2.77 | 0.94 | 3000 | 7.78 |
| VIII[a] | $NaNO_3$ | 3.31 | 0.94 | — | — |
| IX[a] | $Na_2B_4O_7$ 10 $H_2O$ | 7.44 | 0.94 | — | — |
| X | $NaHCO_3$ | 3.28 | 0.94 | 1440 | 9.29 |
| XI | KOH (0.8343 N soln) | 39.0 | 0.79 | 920 | 8.30 |
| XII | $K_2CO_3$ | 2.70 | 0.94 | 1020 | 9.06 |
| XIII | $K_2CO_3$ | 3.00 | 1.05 | 760 | 9.24 |
| XIV | $Li_2CO_3$ | 1.44 | 0.94 | 860 | 9.04 |
| XV[a] | $Ca(NO_3)_2 4H_2O$ | 9.21 | 0.94 | — | — |
| XVI[a] | 10% $Ca(NO_3)_2 4H_2O$ 90% $NaNO_3$ | 0.92 2.98 | 0.94 | — | — |
| XVII[a] | 5% $Ca(NO_3)_2 4H_2O$ 95% $NaNO_3$ | 0.47 3.15 | 0.94 | — | — |

[a]Gelation occurred upon addition of the salt.
[b]Solids: 35.4%

TABLE II

Hydrolytic Stability of Salt-Modified Films

| | Initial | | | | | 1 week (70° C. @ 95% r.h.) | | | | | 2 weeks (70° C. @ 95% r.h.) | | | | |
|---|---|---|---|---|---|---|---|---|---|---|---|---|---|---|---|
| Example | Yield | 100% Modulus | 200% Modulus | Failure | Ultimate Elong. | Yield | 100% Modulus | 200% Modulus | Failure | Ultimate Elong. | Yield | 100% Modulus | 200% Modulus | Failure | Ultimate Elong. |
| I | 3540 | 3352 | — | 3778 | 130 | | | | a | | | | | a | |
| II | 6784 | 5219 | — | 5569 | 135 | 5067 | 3733 | — | 3733 | 100 | | | | a | |
| III | 5467 | 4397 | — | 4762 | 177 | 4691 | 3700 | — | 3701 | 93 | — | — | — | 6064 | 40 |
| IV | — | — | — | 3850 | 20 | — | — | — | 3928 | 20 | | | | a | |
| V | 5422 | 3875 | — | 3875 | 100 | 5601 | — | — | 4310 | 37 | | | | a | |
| VI | 5983 | 4549 | 5000 | 4663 | 157 | 5127 | 3859 | — | 3977 | 113 | — | — | — | 6564 | 20 |
| VII | 4281 | — | — | 3500 | 40 | 4509 | — | — | 3703 | 47 | | | | a | |
| X | 6101 | 4701 | 5407 | 4948 | 137 | 5035 | 3895 | 4903 | 4155 | 150 | 7104 | — | — | 5274 | 53 |
| XI | — | — | — | 5552 | 20 | — | — | — | 4888 | 20 | | | | a | |
| XII | 6407 | 4686 | — | 4937 | 137 | 5539 | 4311 | — | 4659 | 150 | | | | a | |

TABLE II-continued

| | Hydrolytic Stability of Salt-Modified Films | | | | | | | | | | | | | |
|---|---|---|---|---|---|---|---|---|---|---|---|---|---|---|
| | Initial | | | | | 1 week (70° C. @ 95% r.h.) | | | | | 2 weeks (70° C. @ 95% r.h.) | | | |
| Example | Yield | 100% Modulus | 200% Modulus | Failure | Ultimate Elong. | Yield | 100% Modulus | 200% Modulus | Failure | Ultimate Elong. | Yield | 100% Modulus | 200% Modulus | Failure | Ultimate Elong. |
| XIII | 5828 | — | — | 4950 | 50 | 4835 | — | — | 4000 | 40 | — | — | — | 6599 | 20 |
| XIV | 6347 | 5170 | — | 5329 | 120 | 5627 | 4357 | — | 4664 | 140 | — | — | — | 3299 | 20 | a Films were too brittle to test.

Example XVIII 187.0 parts of a polyester diol (of adipic acid and 1,6-hexanediol having an OH-number of 134), 14.9 parts of α,α-dimethylolpropionic acid, 3.2 parts of a polyether monoalcohol of n-butanol, ethylene oxide and propylene oxide (in a molar ratio or ethylene oxide to propylene oxide 83:17) having an OH-number of 26 and 82.1 parts of N-methyl pyrrolidinone were combined and heated to 70° C. The mixture was stirred until homogeneous. To the mixture was added 114.0 parts bis-(4isocyanatocyclohexyl)methane. The mixture was stirred and heated to 105° C. for two hours. The free isocyanate content was determined to be 1.9%. The prepolymer was cooled to 70° C. and 10.7 parts of triethylamine and 56.5 parts of N-methyl pyrrolidinone were added. The resulting anionic prepolymer was added to 390.0 parts of distilled water (38° C.) with vigorous stirring applied. A solution of 4.9 parts diethylenetriamine and 62.9 parts distilled water were added to the dispersed prepolymer over a ten minute period. An additional 141.1 parts of distilled water were added to reduce the viscosity of the resulting dispersion. The dispersion was heated to 70° C. and maintained at that temperature with stirring for 2 hours. The wet properties of the dispersion are given in Table III. Films were prepared, and their hydrolytic stability tested as in Example I. The results are listed in Table IV.

Examples XIX–XXI

To aliquots of 400.0 parts of the dispersion described in Example XVIII were added the materials listed in Table III. The samples were heated to 70° C. under reduced pressure (20 mm Hg) for 2–4 hours. After cooling to room temperature the solids content of each was determined and adjusted with distilled water to 29.6%. The wet properties of the dispersions are given in Table III. Films were prepared and their hydrolytic stability was tested according to Example I. The results are listed in Table IV.

Examples XXII 187.0 parts of a polyester diol (of adipic acid and 1,6-hexanediol having an OH-number of 134), 14.9 parts of a α,α-dimethylolpropionic acid, and 82.1 parts of N-methyl pyrrolidinone were combined and heated to 70° C. The mixture was stirred until homogeneous. To the mixture was added 114.0 parts of bis-(4-isocyanatocyclohexyl)methane. The mixture was stirred and heated to 105° C. for two hours. The free isocyanate content was determined to be 1.8%. The prepolymer was cooled to 70° C. and 10.7 parts of triethylamine and 56.5 parts of N-methyl pyrrolidinone were added. The mixture was heated to 70° C. and stirred at that temperature for 30 minutes. The resulting anionic prepolymer was added to 350.0 parts of distilled water (38° C.) with vigorous stirring applied. Solutions of 4.8 parts diethylenetriamine, 1.2 parts of N-methyl pyrrolidinone and 60.0 parts distilled water were added to the dispersed prepolymers over a ten minute period. The dispersion was heated to 70° C. and maintained at that temperature with stirring for 2 hours. After cooling to room temperature, the solids content was determined and adjusted with distilled water to 29.6%. The wet properties of the dispersion are given in Table III. Films were prepared and their hydrolytic stability tested as in Example I. The results are listed in Table IV.

Example XXIII

To 400.0 parts of the dispersion described in Example XXII were added the materials listed in Table III. This sample was heated to 70° C. under reduced pressure (20 mm Hg) for 2–4 hours. After cooling to room temperature, the solids content was determined and adjusted with distilled water to 29.6%. The wet properties of the dispersion are given in Table III. Films were prepared and their hydrolytic stability was tested as in Example I. The results are listed in Table IV.

TABLE III

| Composition and Wet Properties of Salt-Modified Dispersions | | | | | |
|---|---|---|---|---|---|
| Example | Surfonic N-300[a] (%)[b] | $Na_2CO_3$, parts | Equiv. Salt/ Equiv. $CO_2$ | Viscosity[c] mPa s | pH |
| XVIII | 0.0 | 0.00 | 0.00 | 270 | 8.09 |
| XIX | 0.0 | 2.22 | 1.06 | 65 | 8.84 |
| XX | 2.0 | 2.22 | 1.06 | 75 | 8.67 |
| XXI | 5.0 | 2.22 | 1.06 | 45 | 8.79 |
| XXII | 0.0 | 0.00 | 0.00 | 77 | 8.23 |
| XXIII | 0.00 | 2.10 | 0.97 | 38 | 9.12 |

[a]1540 MW ethoxylated nonyl phenol manufactured by Jefferson Chemical
[b]Percentage based on solids
[c]Solids: 29.6%

TABLE IV

| | Hydrolytic Stability of Salt-Modified Films | | | | | | | | | | | | | | |
|---|---|---|---|---|---|---|---|---|---|---|---|---|---|---|---|
| | Initial | | | | | 1 week (70° C. @ 95% r.h.) | | | | | 2 week (70° C. @ 95% r.h.) | | | | |
| Example | 100% Modulus | 200% Modulus | 300% Modulus | Failure | Ultimate Elong. | 100% Modulus | 200% Modulus | 300% Modulus | Failure | Ultimate Elong. | 100% Modulus | 200% Modulus | 300% Modulus | Failure | Ultimate Elong. |
| XVIII | 1292 | 2217 | — | 3010 | 263 | | | | a | | | | a | | |
| XIX | — | — | — | 1743 | 73 | 1078 | 3478 | — | 4311 | 240 | 992 | 1821 | 2897 | 3302 | 327 |
| XX | — | — | — | 1630 | 80 | 1477 | 2350 | — | 3078 | 243 | 712 | 1051 | — | 1824 | 283 |
| XXI | 1456 | — | — | 1456 | 100 | 1135 | 1705 | 3269 | 3659 | 320 | 499 | 786 | 1212 | 1355 | 320 |
| XXII | 1139 | 1908 | 3818 | 3818 | 300 | 246 | 443 | — | 491 | 227 | | | a | | |

TABLE IV-continued

| | Hydrolytic Stability of Salt-Modified Films | | | | | | | | | | | | | |
|---|---|---|---|---|---|---|---|---|---|---|---|---|---|---|
| | Initial | | | | | 1 week (70° C. @ 95% r.h.) | | | | | 2 week (70° C. @ 95% r.h.) | | | | |
| Example | 100% Modulus | 200% Modulus | 300% Modulus | Failure | Ultimate Elong. | 100% Modulus | 200% Modulus | 300% Modulus | Failure | Ultimate Elong. | 100% Modulus | 200% Modulus | 300% Modulus | Failure | Ultimate Elong. |
| XXIII | 1506 | — | — | 1870 | 140 | 1528 | 2363 | — | 3550 | 257 | 1431 | 2214 | 3930 | 4511 | 323 | a Film completely dissolved.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of an aqueous polyurethane-urea dispersion with improved hydrolytic stability which comprises
    (a) forming an aqueous polyurethane-urea dispersion containing
        (i) about 5 to 120 milliequivalents per 100 grams of polyurethane-urea of chemically incorporated anionic groups wherein at least about 50% of said anionic groups are carboxylic acid groups neutralized with volatile organic bases and
        (ii) up to about 10% by weight, based on the weight of said polyurethane-urea, of lateral and/or terminal hydrophilic chains containing ethylene oxide units and
    (b) converting the volatile organic base-neutralized carboxylic acid groups to non-volatile cation-neutralized carboxylate groups by adding an alkali metal salt of an organic or inorganic acid having a pKa greater than 0 to the aqueous polyurethane-urea dispersion of (a) in an amount sufficient to displace at least a portion of said volatile organic bases as the neutralizing agent for said carboxylic acid groups.

2. The process of claim 1 which comprises removing at least a portion of the volatile organic bases by distillation.

3. The process of claim 1 wherein said organic or inorganic acids have a pKa greater than 5.

4. The process of claim 1 wherein said alkali metal salt comprises a member selected from the group consisting of sodium carbonate and sodium bicarbonate.

5. The process of claim 1 wherein at least about 80% of said anionic groups are carboxylic acid groups neutralized with volatile organic bases.

6. The process of claim 1 wherein said volatile organic bases are tertiary amines.

7. A process for the preparation of an aqueous polyurethane-urea dispersion with improved hydrolytic stability which comprises
    (a) forming an aqueous polyurethane-urea dispersion containing
        (i) about 10 to 120 milliequivalents, per 100 grams of polyurethane urea of chemically incorporated anionic groups wherein at least about 80% of said anionic groups are carboxylic acid groups neutralized with volatile tertiary amines and
        (ii) up to about 10% by weight, based on the weight of said polyurethane-urea of lateral and/or terminal hydrophilic chains containing ethylene oxide units,
    (b) converting the volatile tertiary amine-neutralized carboxylic acid groups to non-volatile cation-neutralized carboxylate groups by adding an alkali metal salt of an organic or inorganic acid having a pKa greater than 5 to the aqueous polyurethane-urea dispersion of (a) and
    (c) removing the volatile tertiary amines by distillation.

8. A process for the preparation of an aqueous polyurethane-urea dispersion with improved hydrolytic stability which comprises
    (a) forming an aqueously dispersed isocyanate-terminated prepolymer containing
        (i) about 10 to 120 milliequivalents, per 100 grams of polyurethane-urea of chemically incorporated anionic groups wherein at least about 80% of said anionic groups are carboxylic acid groups neutralized with volatile tertiary amines and
        (ii) up to about 10% by weight, based on the weight of said polyurethane-urea, of lateral and/or terminal hydrophilic chains containing ethylene oxide units,
    (b) converting the volatile tertiary amine-neutralized carboxylate groups to non-volatile cation-neutralized carboxylate groups by adding an alkali metal salt of an organic or inorganic acid having a pKa greater than 0 to the aqueous medium used for dispersing said isocyanate-terminated prepolymer either before or after dispersing the prepolymer therein, in an amount sufficient to displace at least a portion of the volatile tertiary amines as the neutralizing agent for said carboxylic acid groups,
    (c) chain extending said isocyanate-terminated prepolymer to form said aqueous polyurethane-urea dispersion and
    (d) removing the volatile teritary amines by distillation either before and/or after step (c).

9. The process of claim 2 wherein said distillation is conducted under reduced pressure.

10. The process of claim 9 wherein said weak organic or inorganic acids have a pKa greater than 5.

11. The process of claim 9 wherein said alkali metal salt comprises a member selected from the group consisting of sodium carbonate and sodium bicarbonate.

12. The process of claim 9 wherein said volatile organic bases are tertiary amines.

13. The process of claim 11 wherein said volatile organic bases are tertiary amines.

14. The process of claim 7 wherein said distillation is conducted under reduced pressure.

15. The process of claim 8 wherein said distillation is conducted under reduced pressure.

16. A process for the preparation of an aqueous polyurethane-urea dispersion with improved hydrolytic stability which comprises
    (a) forming an aqueously dispersed isocyanate-terminate prepolymer containing
        (i) about 5 to 120 milliequivalents per 100 grams of polyurethane-urea of chemically incorporated anionic groups wherein at least about 50% of said anionic groups are carboxylic acid groups neutralized with volatile organic bases and (ii) up to about 10% by weight, based on the weight of said polyurethane-urea, of lateral and/or terminal hydrophilic chains containing ethylene oxide units and (b) converting the volatile organic base-neutralized carboxylic acid groups to non-volatile cation-neutralized carboxylate groups by adding an alkali metal salt of an organic or inorganic acid having a pKa greater than 0 to the aqueous medium used for dispersing the isocyanate-terminated prepolymer either before or after dispersing the prepolymer therein, in an amount sufficient to displace at least a portion of said volatile organic bases as the neutralizing agent for said carboxylic acid groups and (c) chain extending said isocyanate-terminated prepolymer to form said aqueous polyurethane-urea disperson.

17. The process of claim 16 which comprises removing at least a portion of the volatile organic bases by distillation either before and/or after step (c).

18. The process of claim 16 wherein said organic or inorganic acids have a pKa greater than 5.

19. The process of claim 16 wherein said alkali metal salt comprises a member selected from the group consisting of sodium carbonate and sodium bicarbonate.

20. The process of claim 16 wherein at least about 80% of said anionic groups are carboxylic acid groups neutralized with volatile organic bases.

21. The process of claim 16 wherein said volatile organic bases are tertiary amines.

* * * * *